(12) United States Patent
Gadgil et al.

(10) Patent No.: US 8,691,719 B2
(45) Date of Patent: *Apr. 8, 2014

(54) SYSTEM AND METHOD FOR INCREASING THE SERVICE LIFE AND/OR CATALYTIC ACTIVITY OF AN SCR CATALYST AND CONTROL OF MULTIPLE EMISSIONS

(75) Inventors: Mandar R. Gadgil, Akron, OH (US); S. Behrooz Ghorishi, Uniontown, OH (US)

(73) Assignee: Babcock & Wilcox Power Generation Group, Inc., Barberton, OH (US)

(*) Notice: Subject to any disclaimer, the term of this patent is extended or adjusted under 35 U.S.C. 154(b) by 102 days.

This patent is subject to a terminal disclaimer.

(21) Appl. No.: 13/117,332

(22) Filed: May 27, 2011

(65) Prior Publication Data

US 2011/0229388 A1 Sep. 22, 2011

Related U.S. Application Data

(63) Continuation-in-part of application No. 12/691,527, filed on Jan. 21, 2010.

(60) Provisional application No. 61/171,619, filed on Apr. 22, 2009.

(51) Int. Cl.

| | |
|---|---|
| *B01J 27/185* | (2006.01) |
| *F23J 11/00* | (2006.01) |
| *F23J 15/00* | (2006.01) |
| *C10L 5/00* | (2006.01) |
| *B01J 27/06* | (2006.01) |
| *C01G 9/00* | (2006.01) |
| *C01G 11/00* | (2006.01) |
| *C01G 13/00* | (2006.01) |
| *C22B 17/00* | (2006.01) |
| *C22B 19/00* | (2006.01) |
| *C22B 43/00* | (2006.01) |

(52) U.S. Cl.
USPC ............ 502/213; 110/345; 44/620; 502/224; 423/99

(58) Field of Classification Search
None
See application file for complete search history.

(56) References Cited

U.S. PATENT DOCUMENTS

| | | | |
|---|---|---|---|
| 4,061,716 A | 12/1977 | McGauley | |
| 4,572,085 A | 2/1986 | Hepworth | |
| 4,831,942 A * | 5/1989 | Morimoto et al. | ............ 110/345 |
| 4,843,980 A | 7/1989 | Markham et al. | |

(Continued)

OTHER PUBLICATIONS

J.P. Chen et al.; Mechanism of Poisoning of the V2O5/TiO2 Catalyst for the Reduction of NO by NH3; Journal of Catalysis, vol. 125, pp. 411 to 420 (Oct. 1990).

(Continued)

*Primary Examiner* — Melvin C Mayes
*Assistant Examiner* — Michael Forrest
(74) *Attorney, Agent, or Firm* — Eric Marich

(57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing or preventing the poisoning and/or contamination of an SCR catalyst. In another embodiment, the method and apparatus of the present invention is designed to protect the SCR catalyst. In still another embodiment, the present invention relates to a method and apparatus for increasing the service life and/or catalytic activity of an SCR catalyst while simultaneously controlling various emissions.

103 Claims, 2 Drawing Sheets

(56) References Cited

U.S. PATENT DOCUMENTS

| | | | |
|---|---|---|---|
| 4,871,522 | A | 10/1989 | Doyle |
| 4,925,633 | A | 5/1990 | Doyle |
| 5,540,897 | A | 7/1996 | Chu et al. |
| 5,567,394 | A | 10/1996 | Chu et al. |
| 5,585,081 | A | 12/1996 | Chu et al. |
| 5,899,679 | A | 5/1999 | Euzen et al. |
| 7,741,239 | B2 * | 6/2010 | Hartenstein et al. ............ 502/25 |
| 8,124,036 | B1 * | 2/2012 | Baldrey et al. .................. 423/99 |
| 2006/0245993 | A1 | 11/2006 | Magumbe et al. |
| 2007/0140940 | A1 | 6/2007 | Varma et al. |
| 2007/0154374 | A1 | 7/2007 | Johnson et al. |
| 2007/0160517 | A1 | 7/2007 | Fan et al. |
| 2008/0107579 | A1 | 5/2008 | Downs et al. |
| 2009/0065414 | A1 | 3/2009 | Nelson et al. |
| 2010/0273643 | A1 | 10/2010 | Gadgil et al. |

OTHER PUBLICATIONS

Vitali V. Lissianski et al.; Utilization of Iron Additives for Advanced Control of NOx Emissions from Stationary Combustion Sources; Ind. Eng. Chem. Res. 2001 (published on the Internet on Jun. 22, 2001), 40, pp. 3287 to 3293.

Terence Ake et al.; Limestone Injection for Protection of SCR Catalyst; Riley Power, Duke Energy, Cormetech, Inc. Paper #175, 2003.

Beck Jens et al.; The Behavior of Particle Bound Phosphorus During the Combustion of Phosphate Doped Coal; Fuel, 86, 2007 (available online Sep. 27, 2006), pp. 632 to 640.

Virpi Kroger; Poisoning of Automotive Exhaust Gas Catalyst Components—The Role of Phosphorus in the Poisoning Phenomena; Academic Dissertation, University of Oulu, Finland—2007.

Elias Matinde et al.; Phosphorus Gasification from Sewage Sludge During Carbothermic Reduction; ISIJ International, vol. 48 (2008), No. 7, pp. 912 to 917.

Athen Tate et al.; Environmentally Sound Handling of Deactivated SCR Catalyst; Downloaded from the Internet on May 13, 2009 at http://www.coalpowermag.com/environmenta1/136.html.

Xiaoyu Guo et al.; Effects of sulfate species on V2O5/TiO2 SCR Catalysts in Coal and Biomass-fired Systems; Applied Catalysis B: Environmental, vol. 92, pp. 30 to 40 (Oct. 2009).

PCT International Search Report dated Aug. 17, 2012 in corresponding PCT application No. PCT/US2012/039175.

\* cited by examiner

SYSTEM AND METHOD FOR INCREASING THE SERVICE LIFE AND/OR CATALYTIC ACTIVITY OF AN SCR CATALYST AND CONTROL OF MULTIPLE EMISSIONS

RELATED APPLICATION DATA

This patent application claims priority to and is a continuation-in-part of U.S. patent application Ser. No. 12/691,527 filed Jan. 21, 2010 and titled "System and Method for Protection of SCR Catalyst and Control of Multiple Emissions," which itself claims priority to and is a non-provisional of U.S. Provisional Patent Application No. 61/171,619 filed Apr. 22, 2009 and titled "System and Method for Protection of SCR Catalyst." The complete text of these patent applications are hereby incorporated by reference as though fully set forth herein in their entireties.

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing or preventing the poisoning and/or contamination of an SCR catalyst. In another embodiment, the method and apparatus of the present invention is designed to protect the SCR catalyst. In still another embodiment, the present invention relates to a method and apparatus for increasing the service life and/or catalytic activity of an SCR catalyst while simultaneously controlling various emissions.

2. Description of the Related Art $NO_x$ refers to the cumulative emissions of nitric oxide (NO), nitrogen dioxide ($NO_2$) and trace quantities of other nitrogen oxide species generated during combustion. Combustion of any fossil fuel generates some level of $NO_x$ due to high temperatures and the availability of oxygen and nitrogen from both the air and fuel. $NO_x$ emissions may be controlled using low $NO_x$ combustion technology and post-combustion techniques. One such post-combustion technique involves selective catalytic reduction (SCR) systems in which a catalyst facilitates a chemical reaction between $NO_x$ and a reagent (usually ammonia) to produce molecular nitrogen and water vapor.

SCR technology is used worldwide to control $NO_x$ emissions from combustion sources. This technology has been used widely in Japan for $NO_x$ control from utility boilers since the late 1970's, in Germany since the late 1980's, and in the US since the 1990's. Industrial scale SCRs have been designed to operate principally in the temperature range of 500° F. to 900° F., but most often in the range of 550° F. to 750° F. SCRs are typically designed to meet a specified $NO_x$ reduction efficiency at a maximum allowable ammonia slip. Ammonia slip is the concentration, expressed in parts per million by volume, of unreacted ammonia exiting the SCR.

For additional details concerning $NO_x$ removal technologies used in the industrial and power generation industries, the reader is referred to *Steam/its generation and use*, 41$^{st}$ Edition, Kitto and Stultz, Eds., Copyright 2005, The Babcock & Wilcox Company, Barberton, Ohio, U.S.A., particularly Chapter 34—Nitrogen Oxides Control, the text of which is hereby incorporated by reference as though fully set forth herein.

Regulations issued by the EPA promise to increase the portion of utility boilers equipped with SCRs. SCRs are generally designed for a maximum efficiency of about 90%. This limit is not set by any theoretical limits on the capability of SCRs to achieve higher levels of $NO_x$ destruction. Rather, it is a practical limit set to prevent excessive levels of ammonia slip. This problem is explained as follows.

In an SCR, ammonia reacts with $NO_x$ according to one or more of the following stoichiometric reactions (a) to (d):

$$4NO+4NH_3+O_2 \rightarrow 4N_2+6H_2O \quad \text{(a)}$$

$$12NO_2+12NH_3 \rightarrow 12N_2+18H_2O+3O_2 \quad \text{(b)}$$

$$2NO_2+4NH_3+O_2 \rightarrow 3N_2+6H_2O \quad \text{(c)}$$

$$NO+NO_2+2NH_3 \rightarrow 2N_2+3H_2O \quad \text{(d)}$$

The above catalysis reactions occur using a suitable catalyst. Suitable catalysts are discussed in, for example, U.S. Pat. Nos. 5,540,897; 5,567,394; and 5,585,081 to Chu et al., all of which are hereby incorporated by reference as though fully set forth herein. Catalyst formulations generally fall into one of three categories: base metal, zeolite and precious metal.

Base metal catalysts use titanium oxide with small amounts of vanadium, molybdenum, tungsten or a combination of several other active chemical agents. The base metal catalysts are selective and operate in the specified temperature range. The major drawback of the base metal catalyst is its potential to oxidize $SO_2$ to $SO_3$; the degree of oxidation varies based on catalyst chemical formulation. The quantities of $SO_3$ which are formed can react with the ammonia carry-over to form various ammonium-sulfate salts.

Zeolite catalysts are aluminosilicate materials which function similarly to base metal catalysts. One potential advantage of zeolite catalysts is their higher operating temperature of about 970° F. (521° C.). These catalysts can also oxidize $SO_2$ to $SO_3$ and must be carefully matched to the flue gas conditions.

Precious metal catalysts are generally manufactured from platinum and rhodium. Precious metal catalysts also require careful consideration of flue gas constituents and operating temperatures. While effective in reducing $NO_x$, these catalysts can also act as oxidizing catalysts, converting CO to $CO_2$ under proper temperature conditions. However, $SO_2$ oxidation to $SO_3$ and high material costs often make precious metal catalysts less attractive.

As is known to those of skill in the art, various SCR catalysts undergo poisoning when they become contaminated by various compounds including, but not limited to, certain phosphorus compounds such as phosphorus oxide (PO) or phosphorus pentoxide ($P_2O_5$). Additionally, it is also well known that SCR catalysts degrade over time and have to be replaced periodically at a significant cost and loss of generating capacity. In a typical 100 MWe coal plant the downtime and cost associated with the replacement of underperforming catalyst can be in the neighborhood of one million US dollars or more.

More particularly, as the SCR catalysts are exposed to the dust laden flue gas there are numerous mechanisms including blinding, masking and poisoning that deactivates the catalyst and causes a decrease in the catalyst's performance over time. The most common catalyst poison encountered when burning eastern domestic coal (i.e., coal mined in the eastern United States) is arsenic. The most common catalyst poison encountered when burning western domestic coal (i.e., coal mined in the western United States) is phosphorus and calcium sulfate is the most common masking mechanism. One method of recycling the used catalyst is the process called regeneration washing or rejuvenation. The initial steps of the regeneration process involve the removal of these toxic chemicals by processing the catalysts through various chemical baths in which the poisons are soluble. While this treatment process does an excellent job of removing the desired poisons it produces wastewater with very high arsenic concentrations.

In another situation, Powder River Basin/Lignite coal plants, any coal/biomass co-combustion, or any coal/bone meal co-combustion or even pure biomass combustion power plants will suffer from phosphorus contamination of their SCR catalysts.

Additionally, beyond controlling $NO_x$ emissions, other emission controls must be considered and/or met in order to comply with various state, EPA and/or Clean Air Act regulations. Some other emission controls which need to be considered for boilers, heaters, kilns, or other flue gas-, or combustion gas-, generating devices (e.g., those located at power plants, processing plants, etc.) include, but are not limited to, mercury, $SO_x$, and certain particulates.

Given the above, a need exists for a method that provides for any economical and environmentally suitable method and/or system to increase catalytic life span and/or catalytic activity of an SCR catalyst while permitting, in some instances, the simultaneous removal of various gaseous compounds (e.g., phosphorus or mercury) from a combustion process.

SUMMARY OF THE INVENTION

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing or preventing the poisoning and/or contamination of an SCR catalyst. In another embodiment, the method and apparatus of the present invention is designed to protect the SCR catalyst. In still another embodiment, the present invention relates to a method and apparatus for increasing the service life and/or catalytic activity of an SCR catalyst while simultaneously controlling various emissions.

Accordingly, one aspect of the present invention is drawn to a method for increasing the active life of an SCR catalyst, the method comprising the steps of: (a) providing at least one iron-bearing compound to a combustion zone or flue gas stream of a furnace, or boiler, prior to entry of the flue gas into an SCR; (b) permitting the at least one iron-bearing compound to react with any gaseous phosphorus compounds, or phosphorus-containing compounds, present in the combustion zone or flue gas prior to the entry of the flue gas into the SCR; (c) providing at least one halide-bearing compound to a combustion zone or flue gas stream of a furnace, or boiler, prior to entry of the flue gas into an SCR, with the proviso that halide-bearing compound is not an iron halide; and (d) permitting the at least one halide-bearing compound to react with and/or oxidize any mercury present in the combustion zone or flue gas, wherein the method achieves an increase in either one, or both, of a catalytic activity and/or a catalytic lifespan of at least about 10 percent at an operational time of at least about 2,000 hours.

In yet another aspect of the present invention, there is provided a method for increasing the active life of an SCR catalyst, the method comprising the steps of: (i) providing at least one iron-bearing compound to a combustion zone or flue gas stream of a furnace, or boiler, prior to entry of the flue gas into an SCR; (ii) permitting the at least one iron-bearing compound to react with any gaseous phosphorus compounds, or phosphorus-containing compounds, present in the combustion zone or flue gas prior to the entry of the flue gas into the SCR; (Iii) providing at least one halide-bearing compound to a combustion zone or flue gas stream of a furnace, or boiler, prior to entry of the flue gas into an SCR, with the proviso that halide-bearing compound is not an iron halide; and (iv) permitting the at least one halide-bearing compound to react with and/or oxidize any mercury present in the combustion zone or flue gas, wherein the method achieves an increase in either one, or both, of a catalytic activity and/or a catalytic lifespan of at least about 10 percent at an operational time of at least about 3,000 hours.

In yet another aspect of the present invention, there is provided a method for simultaneously sequestering one or more phosphorus compounds, or phosphorus-containing compounds, in the form of one or more less reactive iron-phosphorus-containing compounds, and oxidizing mercury, the method comprising the steps of: (A) providing at least one iron-bearing compound to a combustion zone or flue gas stream of a furnace, or boiler; (B) permitting the at least one iron-bearing compound to react with any gaseous phosphorus compounds, or phosphorus-containing compounds, present in the combustion zone or flue gas to form one or more less reactive iron-phosphorus-containing compounds; (C) providing at least one halide-bearing compound to a combustion zone or flue gas stream of a furnace, or boiler, prior to entry of the flue gas into an SCR, with the proviso that halide-bearing compound is not an iron halide; and (D) permitting the at least one halide-bearing compound to react with and/or oxidize any mercury present in the combustion zone or flue gas, wherein the method achieves an increase in either one, or both, of a catalytic activity and/or a catalytic lifespan of at least about 10 percent at an operational time of at least about 4,000 hours.

In yet another aspect of the present invention, there is provided a method for simultaneously sequestering one or more phosphorus compounds, or phosphorus-containing compounds, in the form of one or more less reactive iron-phosphorus-containing compounds, and oxidizing mercury, the method comprising the steps of: (I) providing at least one iron-bearing compound to a combustion zone or flue gas stream of a furnace, or boiler; (II) permitting the at least one iron-bearing compound to react with any gaseous phosphorus compounds, or phosphorus-containing compounds, present in the combustion zone or flue gas to form one or more less reactive iron-phosphorus-containing compounds; (III) providing at least one halide-bearing compound to a combustion zone or flue gas stream of a furnace, or boiler, prior to entry of the flue gas into an SCR, with the proviso that halide-bearing compound is not an iron halide; and (IV) permitting the at least one halide-bearing compound to react with and/or oxidize any mercury present in the combustion zone or flue gas, wherein the method achieves an increase in either one, or both, of a catalytic activity and/or a catalytic lifespan of at least about 15 percent at an operational time of at least about 3,000 hours.

In yet another aspect of the present invention, there is provided a method for sequestering one or more phosphorus compounds, or phosphorus-containing compounds, in the form of one or more less reactive iron-phosphorus-containing compounds while concurrently sequestering mercury, the method comprising the steps of: providing at least one iron-bearing compound to a combustion zone or flue gas stream of a furnace, or boiler; permitting the at least one iron-bearing compound to react with any gaseous phosphorus compounds, or phosphorus-containing compounds, present in the combustion zone or flue gas to form one or more less reactive iron-phosphorus-containing compounds; providing at least one halide-bearing compound to a combustion zone or flue gas stream of a furnace, or boiler, prior to entry of the flue gas into an SCR, with the proviso that halide-bearing compound is not an iron halide; and permitting the at least one halide-bearing compound to react with and/or oxidize any mercury present in the combustion zone or flue gas, wherein the method achieves an increase in either one, or both, of a catalytic activity and/or a catalytic lifespan of at least about 15 percent at an operational time of at least about 4,000 hours.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

While the present invention will be described in terms of SCR systems which use ammonia as the $NO_x$ reducing agent, since ammonia is frequently preferred for economic reasons, the present invention is not limited to ammonia based systems. The concepts of the present invention can be used in any system which uses an ammoniacal compound. As used in the present disclosure, an ammoniacal compound is a term meant to include compounds such as urea, ammonium sulfate, cyanuric acid, and organic amines as well as ammonia ($NH_3$). These compounds could be used as reducing agents in addition to ammonia, but as mentioned above, ammonia is frequently preferred for economic reasons. Some non-ammoniacal compounds such as carbon monoxide or methane can be used as well, but with loss in effectiveness.

Although the present invention is described in relation to a boiler, or a fossil fuel boiler, it is not limited solely thereto. Instead, the present invention can be applied to any combustion source that generates $NO_x$ regardless of whether such a combustion source is utilized in conjunction with a boiler, or a steam generator. For example, the present invention could be used in combination with a kiln, a heater, or any other type of combustion process that generates, in whole or in part, a flue gas or combustion gas containing $NO_x$. Accordingly, the description below is to be construed as merely exemplary.

Figure 1:
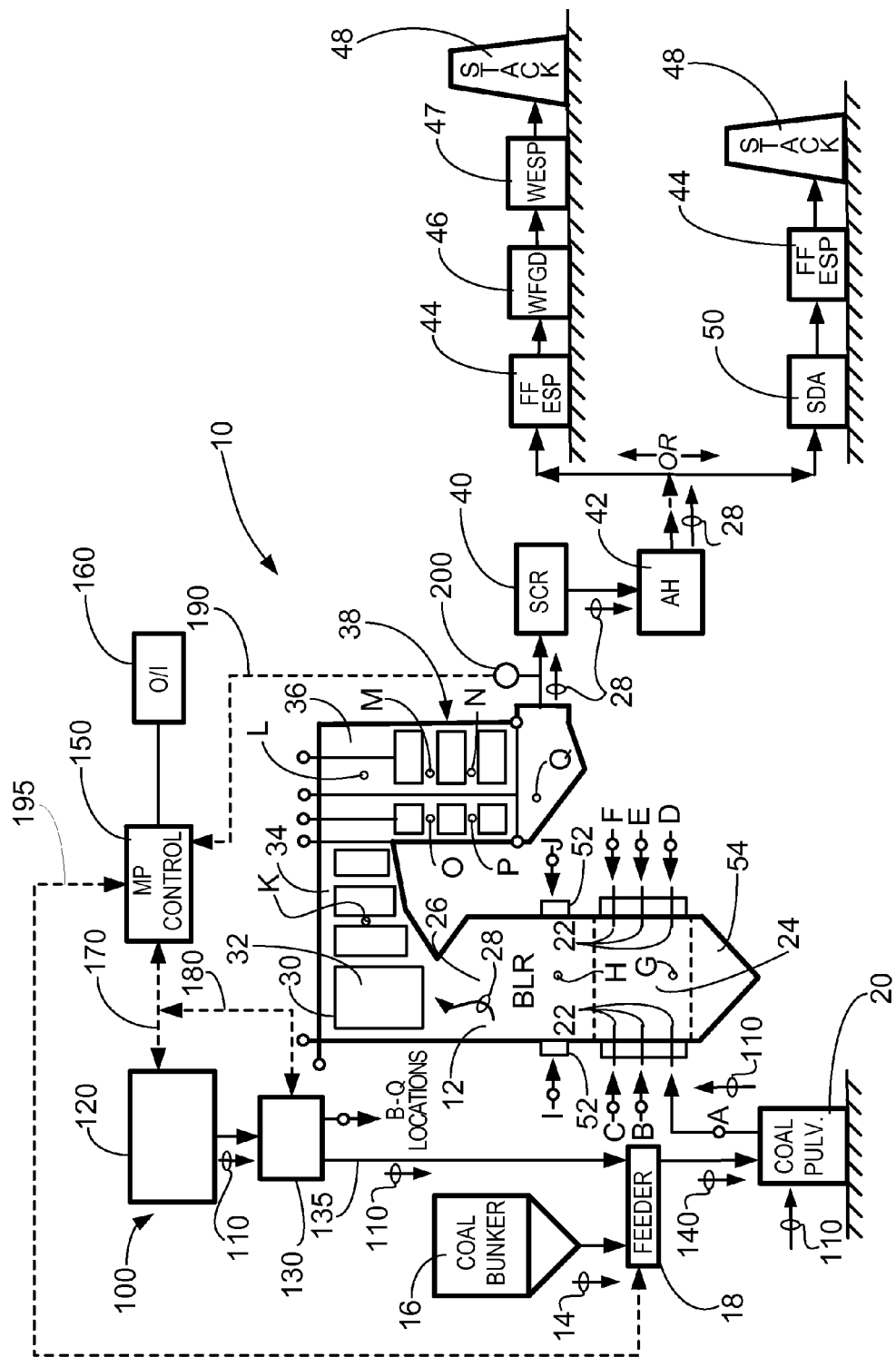
FIG. 1 is a schematic representation of a typical fossil fuel burning facility with an SCR system, and which includes a system for practicing the methods of the present invention.

As illustrated in FIG. 1, the present invention may be applied to a boiler installation which employs a wet flue gas desulfurization (WFGD or wet scrubber) for removal of sulfur oxides from the flue gases, as shown in the upper right-hand side of FIG. 1. In this configuration, the wet scrubber is typically preceded (with respect to a direction of flue gas flow through the system) by a particulate collection device (PCD), advantageously a fabric filter (FF) bag house, or an electrostatic precipitator (ESP). If desired, there may also be provided a wet electrostatic precipitator (wet ESP or WESP) which may be provided as a final "polishing" stage for fine particulate or $SO_3$. Alternatively, the present invention may be applied to a system which employs a spray dryer apparatus (SDA) or dry scrubber for removal of sulfur oxides from the flue gases, as shown in the lower right-hand side of FIG. 1. In this configuration, the SDA or dry scrubber is typically followed (with respect to a direction of flue gas flow through the system) by a particulate collection device (PCD), advantageously a fabric filter (FF) or baghouse, an electrostatic precipitator (ESP) or even a wet electrostatic precipitator (wet ESP).

Additionally, the present invention can be applied to any SCR catalyst that is adversely affected by poisoning with a phosphorus-based compound such as, but not limited to, $H_3PO_4$, PO or $P_2O_5$. As such, the present invention is not limited to any one type of SCR catalyst, but rather is broadly applicable to a wide range of SCR catalyst systems. Suitable catalyst systems for which the present invention is applicable include, but are not limited to, honeycomb, plate or corrugated type configurations.

In one embodiment, the present invention is directed to reducing the rate of SCR catalyst deactivation on Powder River Basin (PRB) coal combustion units. It should be noted that although the present invention is described in relation to PRB coal, the present invention is not limited thereto. Rather, the present invention is broadly applicable to any situation where an SCR catalyst is poisoned by one or more gaseous phosphorus compounds.

In one embodiment, phosphorus in PRB coal is suspected to cause rapid deactivation in staged combustion and other units. This deactivation is suspected to be caused by the gas phase phosphorus released via carbothermic reduction reaction. In this reaction under oxygen deficient conditions, phosphorus bearing compounds release gas phase phosphorus by the following reaction:

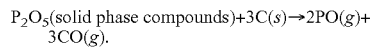

$$P_2O_5(\text{solid phase compounds}) + 3C(s) \rightarrow 2PO(g) + 3CO(g).$$

This gas phase phosphorus attaches to the active sites within the catalyst causing the deactivation of the sites for $NO_x$ reduction. As a result of this deactivation the SCR catalyst cannot carry out the $NO_x$ reduction process to the same performance level as unused catalyst.

In one embodiment, the present invention relates to a system and method to prevent formation of gas phase phosphorus species in the combustion environment thus reducing, mitigating and/or eliminating the rate of SCR deactivation. In one embodiment, the present invention accomplishes the aforementioned goal by the addition of at least one iron-bearing compound to the PRB coal prior to combustion.

In another embodiment, the present invention is directed to a system and method designed to increase the catalytic activity and/or catalytic life span. In this case, the increase in catalytic activity and/or increase in catalytic life span is measured against a standard, or known, rate of decline in catalytic activity and/or life for a given a boiler, fossil fuel boiler, kiln, heater, or any other type of device that generates a flue gas or combustion gas containing $NO_x$.

In one embodiment, the iron-bearing compounds of the present invention is any iron compound (e.g., an iron oxide compound) that is able to undergo reduction in the combustion environments common to boilers, furnaces, power plants, etc. In one particular embodiment, the iron-bearing compound is iron (III) oxide ($Fe_2O_3$), also known as red iron oxide or hematite. In the embodiment where iron (III) oxide is utilized the reactions of interest that occur in the combustion portion of a boiler or furnace are as shown below:

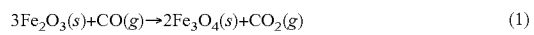

$$3Fe_2O_3(s) + CO(g) \rightarrow 2Fe_3O_4(s) + CO_2(g) \tag{1}$$

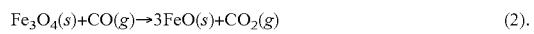

$$Fe_3O_4(s) + CO(g) \rightarrow 3FeO(s) + CO_2(g) \tag{2}.$$

It should be noted that the $Fe_3O_4$, also known as black iron oxide or magnetite, of the first reaction above can also be written more accurately as $FeO \cdot Fe_2O_3$. The FeO or iron (II) oxide, also known as ferrous oxide, which is generated due to the reduction of $Fe_2O_3$ is then available to tie-up, bind and/or sequester any PO gas present in the combustion zone, or the flue gas, of a boiler, or furnace, prior to arrival at the SCR. This PO gas will then form Fe—P compounds in particulate phase prior to arrival at the SCR. The particulate will pass through the catalyst and avoid the catalyst deterioration.

In another embodiment, the present invention can utilize iron (II) carbonate which is converted to the desired iron (II) oxide in the combustion zone via the reaction shown below:

$$FeCO_3(s) \rightarrow FeO(s) + CO_2(g) \qquad (3).$$

In still another embodiment, the present invention can utilize a combination of one or more iron-containing compounds and one or more halide compounds, with the proviso that the halide containing compound is not an iron halide. Thus, in this embodiment at least one iron-containing compound is utilized in conjunction with at least one non-iron halide containing compound. In still another embodiment, the at least one iron compound has a generic formula of AX, where A is equal to iron and X is either an oxide or carbonate ion, anion, group, and/or moiety and the at least one halide compound has a generic formula of BY where B is any atom, element, or cation except for iron and Y is a halide selected from chlorine, bromine, fluorine, or iodine.

In one embodiment, suitable halides for use in conjunction with the present invention include, but are not limited to, potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, other transition metal halides (e.g., bromides, chlorides, fluorides and/or iodides) with the proviso that the transition metal is not iron, or any mixture of two or more thereof. In still another embodiment, any one or more halide compounds in accordance with the proviso defined above can be used in combination with one or more non-halide containing iron compounds (e.g., iron (II) carbonate). In still another embodiment, the present invention utilizes a combination of iron (II) carbonate with calcium bromide to control the amount of phosphorus in a flue gas, or combustion gas while concurrently permitting both the control of mercury compounds, or mercury-containing compounds, in a flue gas, or combustion gas and the increase in catalytic activity and/or service life. In still yet another embodiment, the present invention utilizes a combination of iron (II) carbonate with calcium chloride to control the amount of phosphorus in a flue gas, or combustion gas while concurrently permitting both the control of mercury compounds, or mercury-containing compounds, in a flue gas, or combustion gas and the increase in catalytic activity and/or service life. In still yet another embodiment, the present invention utilizes a combination of iron (II) carbonate with either one, or both, of aluminum bromide and/or aluminum chloride to control the amount of phosphorus in a flue gas, or combustion gas while concurrently permitting both the control of mercury compounds, or mercury-containing compounds, in a flue gas, or combustion gas and the increase in catalytic activity and/or service life. As used herein, mercury compounds, or mercury-containing compounds, include, but are not limited to, any compound that contains either oxidized mercury, or bound elemental mercury. In still another embodiment, the present invention is directed to concurrently permitting the control of mercury compounds, or mercury-containing compounds, that contain primarily, or only, oxidized mercury.

As used herein, any iron compound suitable for use in conjunction with the present invention can be utilized in a hydrated or non-hydrated form. As such, reference to any iron compound herein by definition includes any hydrated forms that exists whether or not specifically mentioned by chemical formula.

As is known in the art, (see, e.g., United States Patent Application Publication No. 2008/0107579 the text of which is hereby incorporated by reference as though fully set forth herein) halide-containing compounds are utilized to oxidize elemental mercury present in a flue, or combustion, gas. Due to this oxidation reaction, the halide portion of a suitable halide-containing compound permits elemental mercury to be converted into a more favorable form for subsequent capture, or sequestration, via one or more suitable environmental control technologies (e.g., a wet scrubber or spray dry absorber (SDA), a flue gas desulfurization system (FGD), a powdered activated carbon system (PAC), or a particulate collecting system such as a fabric filter (FF) or a electrostatic precipitator (ESP)). In one instance, as is known in the art, the addition of one or more suitable halide-containing compounds also increases the amount of mercury that is particulate-bound. Given that numerous patents and published applications detail the manner by which suitable halide-containing compounds permit the increased recovery of mercury from a flue, or combustion, gas, a detailed discussion hereof is omitted for the sake of brevity.

In any of the above embodiments, the suitable one or more iron-bearing compounds, and if so desired the one or more halide compounds, can be added to the coal via one or more pulverizers. In still another embodiment, the one or more iron-bearing compounds, and if so desired the one or more halide compounds, of the present invention can be added to the combustion zone of a boiler and/or furnace via one or more suitable supply lines designed to deliver a powderized, solid, aqueous suspension, suspension, or aqueous solution of the one or more iron-bearing compounds and/or the one or more halide compounds to the combustion zone of a furnace and/or boiler. To this end, FIG. 1 illustrates several embodiments of suitable design schemes for accomplishing this result.

Referring to FIG. 1, there is illustrated a schematic representation of a typical fossil fuel burning facility, generally designated 10, with an SCR system, and which includes a system for practicing the methods of the present invention. As shown, boiler 12 is provided for extracting the heat from the combustion of a fossil fuel, such as coal, through combustion with an oxidant, typically air. The heat is transferred to a working fluid, such as water, to generate steam used to either generate power via expansion through a turbine generator apparatus (not shown) or for industrial processes and/or heating.

The raw coal 14 must be crushed to a desired fineness and dried to facilitate combustion. Raw coal 14 is temporarily stored in a coal bunker 16 and then transferred by means of a gravimetric or volumetric feeder 18 to one or more coal pulverizers 20. In the embodiment shown in FIG. 1, there are six (6) coal pulverizers, identified as coal pulverizers A-F. As is known to those skilled in the art, each coal pulverizer 20 grinds the coal to a desired fineness (e.g., 70% through 200 mesh) and as it is ground, hot primary air from primary air fans (not shown) is conveyed into each coal pulverizer 20 to preheat and remove moisture from the coal to desired levels as it is ground. The primary air is also used to convey the pulverized coal (PC) out of each coal pulverizer 20 and delivers it along a plurality of pulverized coal supply lines (one such burner line is identified at A in FIG. 1; a single coal pulverizer 20 may supply coal through 4-8 pulverized coal supply lines) to the burners 22 on the front and rear walls of the boiler 12. Typically, the burners 22 are located in spaced elevations on one or both of the opposed front and rear walls of the boiler 12, or at the corners of the boiler in installations known as corner-fired or tangentially-fired units (not shown). The present invention can be utilized in conjunction with, but is not limited solely to, single-wall fired, opposed-wall fired and corner- or tangentially-fired units. Typically, a single coal pulverizer 20 only provides coal to a single elevation of burners 22 on a wall. Thus, in the embodiment shown in FIG. 1, the six coal pulverizers A-F supply corresponding burner elevations A-F. However, as is known to those skilled in the art, other pulverizer and burner configurations are known (e.g., single pulverizers supplying burners on multiple walls and/or elevations or multiple pulverizers supplying burners on a single elevation) and the present invention applies to any such configurations.

The combustion process begins in the burner zone 24 of the boiler 12's furnace 26, releasing heat and creating hot flue gas 28 which is conveyed upwardly to the upper portion 30 of the boiler 12, across heating surfaces schematically indicated as rectangles 32. The flue gas 28 is then conveyed across the heating surfaces in the pendant convection pass 34, into the upper portion 36 of the horizontal convection pass 38. The flue gas 28 is then conveyed through a selective catalytic reduction (SCR) apparatus 40 where $NO_x$ in the flue gas is reduced, and then through primary and secondary air heater devices schematically indicated at 42. The air heaters 42 extract additional heat from the flue gas 28, lowering the temperature of the flue gas, and preheat the incoming air used for combustion.

As illustrated in FIG. 1, and downstream of the air heaters 42, the flue gas 28 undergoes further treatment for the removal of particulates and sulfur oxides. Two typical configurations of the downstream equipment employed to accomplish these tasks are shown on the right-hand side of FIG. 1. The upper equipment configuration in FIG. 1 comprises a particulate collection device (PCD) schematically indicated at 44, for removal of particulates from the flue gas 28, and which may comprise in practice a fabric filter or an electrostatic precipitator. Downstream of the PCD 44 there is provided a wet flue gas desulfurization (WFGD) device, also known as a wet scrubber, for removal of sulfur oxides from the flue gas 28. The cleaned, scrubbed flue gas may (optionally) be conveyed through a wet ESP 47 for removal of fine particulate or $SO_3$, and then conveyed to stack 48 for discharge to the atmosphere.

The lower equipment configuration in FIG. 1 comprises a spray dryer apparatus (SDA) schematically indicated at 50, also known as a dry scrubber, for removal of sulfur oxides from the flue gas 28. Downstream of the SDA 50 there is provided a particulate collection device (PCD) 44, as described above, for removal of particulates from the flue gas 28. The cleaned, scrubbed flue gas is then conveyed to stack 48 for discharge to the atmosphere.

In order to further reduce $NO_x$ emissions, some boilers 12 employ staged combustion wherein only part of the stoichiometric amount of air is provided in the main burner zone 24, with the balance of the air for combustion, together with any excess air required due to the fact that no combustion process is 100% efficient, is provided above the burner zone 24 via over fire air (OFA) ports 52. If staged combustion is employed in a boiler 12, due to the reduced air supplied to the burner zone 24, a reducing atmosphere is created in the lower portion of the furnace 26, including the hopper region 54.

In accordance with a first embodiment of the present invention, one or more suitable iron-bearing compounds, and if so desired one or more suitable halide compounds, are added to the one or more coal pulverizers 20 prior to supplying the pulverized coal to the one or more burners 22. The system and apparatus for accomplishing this desired result is also shown in FIG. 1, generally designated 100. The system 100 comprises a storage means 120 for temporarily storing the iron-based phosphorus reduction compound, and if so desired the mercury reducing compound, generally designated 110; delivery means 130, 135 for conveying the compound 110 to a desired location, including valves, seals, etc. as required; and control means 150, advantageously microprocessor-based control means, which are accessed via an operator via human operator interface (I/O) station 160, which includes display and data collection and storage means as required. Although not illustrated individually, the system of the present invention can, in one embodiment, utilize independent storage, delivery and control means (in accordance with those described above) for each individual iron and/or halide compound. In still another embodiment, the system of the present invention can comprise one set of storage, delivery and control means for the iron compounds or compounds utilized herein and one set of storage, delivery and control means (in accordance with those described above) for the halide compound or compounds utilized herein.

In FIG. 1, the raw coal 14 to which the iron-based phosphorus reducing compound 110 has been added is referred to as 140. Advantageously, the iron-based phosphorus reducing compound 110 may be provided along with the raw coal 14 via the feeder 18, which permits close control and measurement of the delivery of both raw coal 14 and iron-based phosphorus reducing compound 110 into the coal pulverizer 20. Alternatively, the iron-based phosphorus reducing compound 110 may be provided directly into the coal pulverizer 20 and/or directly into one or more individual burner lines A-F providing the pulverized coal to individual burners 22, with suitable sealing devices against the positive pressure within the coal pulverizer 20 or burner lines A-F. The delivery means may be slurry-based or pneumatic as required by the particulars of the iron-based phosphorus reducing compound 110 and the amount and location of introduction into the flue gas 28. An interconnected arrangement of control or signal lines 170, 180, 190 and 195 interconnect these various devices to provide control signals, iron-based phosphorus reducing compound 110 level signals, and phosphorus level signals in the flue gas 28 (from a sensor 200) to permit the introduction of the iron-based phosphorus reducing compound 110 into the flue gas 28 to be controlled by a human operator, or automatically controlled. However, if a suitable, real-time sensor 200 for measuring levels of gaseous phosphorus in the flue gas 28 is not available, flue gas samples may instead be taken at the location 200 for later laboratory analysis via suitable test methods, which may be inductively coupled plasma-mass spectrometry (ICP-MS). Based upon the laboratory results, a human operator could then use the operator interface 160 to manually input a desired set-point into control means 150 for the amount of iron-based phosphorus reducing compound 110 introduced into the flue gas 28. Provided that subsequent laboratory analyses do not indicate any significant variation in gaseous phosphorus levels in the flue gas 28, there may be no need for real-time, close control of the introduction of iron-based phosphorus reducing compound 110. Instead, the amount of iron-based phosphorus reducing compound 110 introduced into the flue gas 28 may be simply a function of boiler load or coal feed rate values.

In still yet another embodiment, the present invention utilizes iron (II) oxide. In this embodiment, the need for a reduction reaction to occur is eliminated and the addition points for the iron (II) oxide of this embodiment are therefore broader then previous embodiments. In this case, the iron (II) oxide can be added at any suitable point post-combustion and pre-SCR in order to tie up, bind and/or sequester any PO gas present in the flue gas of a boiler, or furnace, prior to arrival at the SCR. In particular, the iron-based phosphorus reduction compound can be supplied at one or more of the locations G through Q shown in FIG. 1. More particularly, the iron-based phosphorus reduction compound can also be provided into the flue gas 28 at one or more of the following locations:

G: into or below the burner zone 24, in one or more of the front, rear or side walls, via means separate from the burners 22;

H: into the furnace 26 at a location above the burner zone 24, in one or more of the front, rear or side walls;

I, J: into the furnace 26 in the vicinity of or via the OFA ports 52 on one or both of the front or rear walls;

K: into the boiler 12 in the pendant convection pass 34;

L: into the boiler 12 in the upper portion 36 of the horizontal convection pass 38;

M, N, O, P: into the boiler 12 in the horizontal convection pass 38; and/or

Q: into the boiler 12 in the hopper region below the horizontal convection pass 38.

Given the above, it should be noted that in addition to the introduction of the one or more iron-based phosphorus reduction compounds, the above-mentioned systems, methods and/or control apparatuses and/or technologies can also be utilized to introduce one or more halide compounds in accordance with the present invention as detailed above. Thus, in one embodiment, the present invention is directed to a system whereby both one or more iron-based compounds and one or more halide compounds are supplied in any manner per the various methods and/or systems described herein. In another embodiment, each type of compound, or even each separate compound regardless of type, can be supplied individually. In still another embodiment, any combination of two or more compounds regardless of type (i.e., whether an iron-based compound or a halide compound) can be supplied together so long as the one compound does not react detrimentally with the other compound.

Furthermore, given the above, the reduced iron, or iron (II) oxide, of the present invention is able to remove the gas phase phosphorus in the form of iron-phosphorus alloys which upon coming in contact with the over fire air from iron-phosphorus oxide compounds. This significantly reduces the amount of gas phase phosphorus accumulation in an SCR catalyst. Another advantage of the present invention is that through addition of iron a significant portion of any phosphorus present will be iron-bound. Iron-bound phosphorus compounds are less leachable thereby minimizing the transfer of phosphorus to an SCR catalyst. Furthermore, phosphorus associated with and/or bound to an iron compound (e.g., an iron oxide) is more stable than phosphorus that is associated with and/or bound to a calcium compound (e.g., calcium oxide). Given this, the present invention is, in one embodiment, directed to the situation where a majority of the phosphorus present in the combustion and/or flue gas stream is sequestered in a suitable iron-phosphorus-oxygen-containing compound thereby substantially reducing the amount of calcium/phosphorus/oxygen-containing compounds that are able to react with $SO_x$. This in turn substantially reduces the amount of gaseous phosphorus that is produced in the combustion and/or flue gas stream by restricting the amount of calcium/phosphorus/oxygen-containing compounds that are present in the combustion and/or flue gas stream to react with various $SO_x$ compounds resulting in the unwanted production of gaseous phosphorus compounds, or phosphorus/oxygen compounds, that can lead to the undesired poisoning of an SCR catalyst.

In still another embodiment, the iron-bearing compounds and/or halide compounds of the present invention can be added in any suitable manner, including the manner detailed in the FIG. 1. Suitable iron-bearing compounds include, but are not limited to, aqueous and soluble forms of iron-bearing compounds such as metallic iron, one or more iron oxides, iron carbonate, or mixtures of two or more thereof. Suitable halide compounds include, but are not limited to, potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, other transition metal halides (e.g., bromides, chlorides, fluorides and/or iodides) with the proviso that the transition metal is not iron, or any mixture of two or more thereof. If an existing skid is used then one or more aqueous reagents can be pumped via positive displacement pumps from a storage tank to the one or more coal feeders where the reagent is sprayed on the coal as the coal passes on a feeder belt upstream of the pulverizers. In this instance, if so utilized the one or more halide compounds are chosen to be soluble in water, or an aqueous-based solvent. Suitable halides soluble halides include, but are not limited to, potassium bromide, potassium chloride, potassium fluoride, potassium iodide, sodium bromide, sodium chloride, sodium fluoride, sodium iodide, calcium bromide, calcium chloride, calcium iodide, aluminum bromide, aluminum chloride, aluminum iodide, or any mixtures of two or more thereof. In still another embodiment, other transition metal halides (e.g., bromides, chlorides, fluorides and/or iodides) that are not iron halides can be utilized so long as such compounds are, in this embodiment, soluble in water, or an aqueous-based solvent.

In one embodiment, the present invention is advantageous in that it is applicable to both existing SCRs (retrofits) and new SCRs. Additionally, the present invention can be applied to plants that utilize biomass as a fuel source. In one embodiment, implementation of the present invention can be accomplished in a cost-effective manner utilizing low cost hardware designed to supply the necessary iron compound to a combustion process. The present invention also does not affect the current design of boilers and SCRs.

In one embodiment, the amount of iron compound, or compounds, utilized in conjunction with the present invention varies depending upon the phosphorus content in the coal to be burned. In one embodiment, the present invention is directed to a method and system whereby a stoichiometric excess one or more iron compounds are supplied to any point prior to an SCR. While not wishing to be bound to any one theory, it has been found that by supplying a stoichiometric excess of iron upstream of an SCR, the catalytic activity and/or catalytic lifespan of an SCR catalyst can be unexpectedly increased. As can be seen from the graph of FIG. 2, the addition of a stoichiometric excess of one or more iron-based compounds not only protects the SCR catalyst from poisoning via various phosphorus compounds but also increases both the catalytic activity and catalytic lifespan over a period of at least about 2,000 operational hours.

Figure 2:
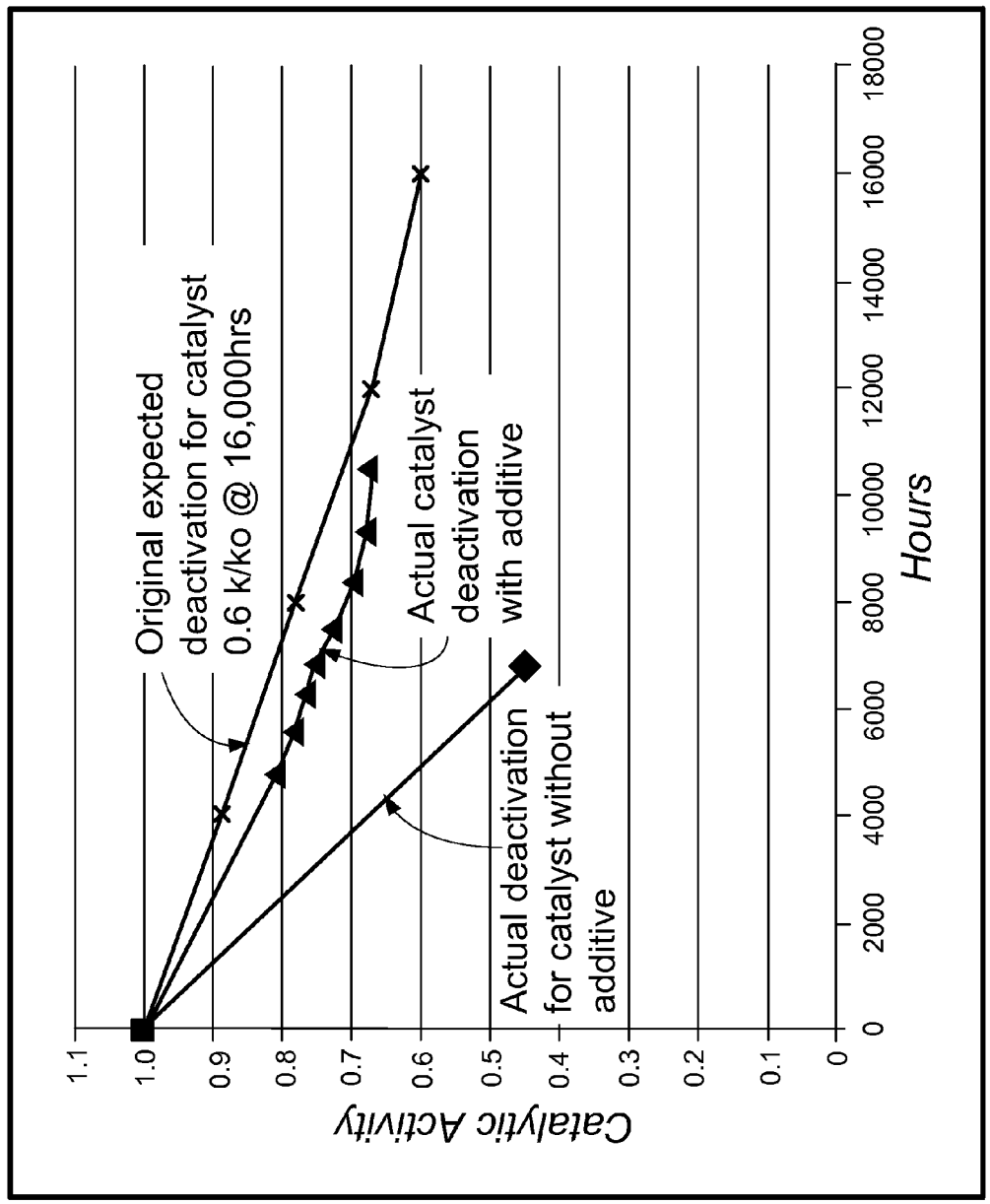
FIG. 2 is a graph illustrating one example of an increase in catalytic activity and catalytic lifespan as realized via utilization of a system and method in accordance with one embodiment of the present invention.

Regarding FIG. 2, FIG. 2 is a graph plotting the original expected deactivation for a catalyst without the addition of the iron-bearing compound, or compounds, of the present invention versus the actual deactivation of a catalyst with the addition of an iron-bearing compound of the present invention versus the observed deactivation of a catalyst without the addition of the iron-bearing compound, or compounds, of the present invention. The y-axis of the graph of FIG. 2 is catalytic activity in decimal terms where 0.9 is equivalent to 90 percent activity as measured when compared to unused virgin catalyst as determined using any suitable method for determining catalytic activity known to those of skill in the art. The x-axis of the graph of FIG. 2 is the number of operational hours that the catalyst in question is exposed to the average operational conditions of a 100 MWe coal plant.

Given the above, in one embodiment the present invention achieves either one, or both, of an increase in catalytic activity and/or an increase in catalytic lifespan via the use, introduction and/or delivery of one or more iron-based compounds. In one embodiment, an increase in either one, or both, of catalytic activity and/or catalytic lifespan of at least about 10 percent is achieved at an operational time of at least about 2,000 hours versus the catalytic activity and/or catalytic lifespan of a given catalyst when subjected to similar operational conditions but not subjected to a supply of one or more iron-based compounds as disclosed herein. As would be apparent to those of skill in the art, various known methods are available to measure the baseline catalytic activity as well as the catalytic activity of various catalysts, including SCR catalysts. As such, a detailed discussion herein is omitted for the sake of brevity.

In another embodiment, the present invention achieves an increase in either one, or both, of catalytic activity and/or catalytic lifespan of at least about 10 percent is achieved at an operational time of about 2,000 hours, an increase of at least about 12.5 percent is achieved at an operational time of about 2,000 hours, an increase of at least about 15 percent is achieved at an operational time of about 2,000 hours, an increase of at least about 17.5 percent is achieved at an operational time of about 2,000 hours, an increase of at least about 20 percent is achieved at an operational time of about 2,000 hours, an increase of at least about 22.5 percent is achieved at an operational time of about 2,000 hours, an increase of at least about 25 percent is achieved at an operational time of about 2,000 hours, an increase of at least about 27.5 percent is achieved at an operational time of about 2,000 hours, or even an increase of at least about 30 percent is achieved at an operational time of about 2,000 hours versus the catalytic activity and/or catalytic lifespan of a given catalyst when subjected to similar operational conditions but not subjected to a supply of one or more iron-based compounds as disclosed herein. Here, as well as elsewhere in the specification and claims, individual numerical values can be combined to form additional and/or non-disclosed ranges.

In still another embodiment, the present invention achieves an increase in either one, or both, of catalytic activity and/or catalytic lifespan of at least about 10 percent is achieved at an operational time of about 2,500 hours, an increase of at least about 12.5 percent is achieved at an operational time of about 2,500 hours, an increase of at least about 15 percent is achieved at an operational time of about 2,500 hours, an increase of at least about 17.5 percent is achieved at an operational time of about 2,500 hours, an increase of at least about 20 percent is achieved at an operational time of about 2,500 hours, an increase of at least about 22.5 percent is achieved at an operational time of about 2,500 hours, an increase of at least about 25 percent is achieved at an operational time of about 2,500 hours, an increase of at least about 27.5 percent is achieved at an operational time of about 2,500 hours, or even an increase of at least about 30 percent is achieved at an operational time of about 2,500 hours versus the catalytic activity and/or catalytic lifespan of a given catalyst when subjected to similar operational conditions but not subjected to a supply of one or more iron-based compounds as disclosed herein. Here, as well as elsewhere in the specification and claims, individual numerical values can be combined to form additional and/or non-disclosed ranges.

In still yet another embodiment, the present invention achieves an increase in either one, or both, of catalytic activity and/or catalytic lifespan of at least about 10 percent, at least about 12.5 percent, at least about 15 percent, at least about 17.5 percent, at least about 20 percent, at least about 22.5 percent, at least about 25 percent, at least about 27.5 percent, or even at least about 30 percent is achieved at an operational time of about 3,000 hours versus the catalytic activity and/or catalytic lifespan of a given catalyst when subjected to similar operational conditions but not subjected to a supply of one or more iron-based compounds as disclosed herein. In still yet another embodiment, the present invention achieves an increase in either one, or both, of catalytic activity and/or catalytic lifespan of at least about 10 percent, at least about 12.5 percent, at least about 15 percent, at least about 17.5 percent, at least about 20 percent, at least about 22.5 percent, at least about 25 percent, at least about 27.5 percent, or even at least about 30 percent is achieved at an operational time of about 3,500 hours, about 4,000 hours, about 4,500 hours, about 5,000 hours, about 6,000 hours, about 7,000 hours, about 7,500 hours, about 8,000 hours, about 9,000 hours, about 10,000 hours, about 11,000 hours, about 12,000 hours, about 13,000 hours, about 14,000 hours, about 15,000 hours, or even about 16,000 hours versus the catalytic activity and/or catalytic lifespan of a given catalyst when subjected to similar operational conditions but not subjected to a supply of one or more iron-based compounds as disclosed herein. Here, as well as elsewhere in the specification and claims, individual numerical values can be combined to form additional and/or non-disclosed ranges.

As is known to those of skill in the art, the phosphorus content of coal can be determined by various known methods. Thus, in this instance, the present invention is not limited to any one range of iron compounds that are utilized. Instead, an excess stoichiometric ratio is utilized. In one embodiment, the excess stoichiometric ratio of iron to phosphorus is in the range of about 2.5:1 to about 10:1, or from about 3:1 to about 9:1, or from about 3.5:1 to about 8:1, or from about 4:1 to about 7.5:1, or from about 5:1 to about 7:1, or from about 5.5:1 to about 6.5:1, or even about 6:1. Here, as well as elsewhere in the specification and claims, individual range values can be combined to form additional and/or non-disclosed ranges.

In another embodiment, the amount of iron compound, or compounds, utilized in conjunction with the present invention is within a given range when the coal utilized is Powder River Basin/Lignite coal. In this embodiment, the amount of the iron compound, or compounds, to Powder River Basin/Lignite coal is expressed as the amount of iron compound, or compounds, (hereinafter referred to as just "iron" in only this instance) in pounds for every 1,000 pounds of coal. In one embodiment, the amount of iron compound, or compounds, utilized is in the range of about 5 pounds of "iron" per 1,000 pounds of coal to about 20 pounds of "iron" per 1,000 pounds of coal. In another embodiment, the amount of iron compound, or compounds, utilized is in the range of about 5.5 pounds of "iron" per 1,000 pounds of coal to about 17.5 pounds of "iron" per 1,000 pounds of coal, or from about 6 pounds of "iron" per 1,000 pounds of coal to about 15 pounds of "iron" per 1,000 pounds of coal, or from about 7 pounds of "iron" per 1,000 pounds of coal to about 12.5 pounds of "iron" per 1,000 pounds of coal, or from about 7.5 pounds of "iron" per 1,000 pounds of coal to about 10 pounds of "iron" per 1,000 pounds of coal, or even from about 8 pounds of "iron" per 1,000 pounds of coal to about 9 pounds of "iron" per 1,000 pounds of coal. Here, as well as elsewhere in the specification and claims, individual range values can be combined to form additional and/or non-disclosed ranges.

In another embodiment, where both an iron-based compound and a halide compound as defined above are utilized, the amount of iron-based compound, or compounds, as compared on a weight basis to the amount of one or more halide compounds is in the range of about 95 weight parts iron based compound, or compounds to about 5 weight parts halide compound, or compounds. In another embodiment, the weight ratio of iron-based compound, or compounds, to halide compound, or compounds, is in the range of about 95:5 to about 75:25, or from about 93.5:6.5 to about 80:20, or from about 92:8 to about 82.5:17.5, or from about 91:9 to about 85:15, or even from about 90:10 to about 87.5:12.5. Thus, in one embodiment, the amount of the one or more halide compounds, if so utilized, can be calculated based on any of the above stated iron-based compound, or compounds, amounts via the ratios disclosed in this paragraph. Here, as well as elsewhere in the specification and claims, individual range values can be combined to form additional and/or non-disclosed ranges.

In another embodiment, the injection rate of the one or more halide compounds, if so utilized in conjunction with the present invention, for controlling mercury in a flue gas, or combustion gas, is based on a non-limiting example of a 100 MWe coal power plant. In this case, the injection rate for the one or more halide compounds, if in solution, is in the range of about 0.25 gallons per hour to about 10 gallons per hour, or from about 0.5 gallons per hour to about 5 gallons per hour, or even from about 1 gallon per hour to about 4 gallons per hour. In another embodiment, regardless of power plant or combustion plant size, the one or more halide compounds are supplied at any rate to a flue gas, or combustion gas, sufficient to yield a concentration of halide (e.g., bromide, chloride or iodide) between about 10 ppm to about 200 ppm, or between about 25 ppm to about 175 ppm, or from about 50 ppm to about 150 ppm. It should be noted that depending upon the emissions control technology in place on the device generating the flue gas, or combustion gas, it may be desirable to use a lower halide concentration in order to prevent any type of detrimental effects to such downstream emissions technology. In one embodiment of such an instance the concentration of halide is between about 10 ppm to about 125 ppm, or from about 25 ppm to about 100 ppm, or from about 50 ppm to about 75 ppm. Here, as well as elsewhere in the specification and claims, individual range values (even from different embodiments) can be combined to form additional and/or non-disclosed ranges.

In light of the above, one of skill in the art would recognize that the amount of one or more iron, or iron-based, compounds necessary to supply the desired amount of iron to a flue gas, or combustion gas, in accordance with the process of the present invention will vary depending upon the size of the device generating such flue gas, or combustion gas. The same can be said of the one or more halide compounds. That is, one of skill in the art would recognize that the amount of one or more halide compounds necessary to supply the desired amount of halide to a flue gas, or combustion gas, in accordance with the process of the present invention will vary depending upon the size of the device generating such flue gas, or combustion gas. Thus, the present invention is not limited to any specific rate or range of supply.

In another embodiment, for a 100 MWe coal power plant the amount of halide solution (25 weight percent solution) supplied to the flue gas, or combustion gas, is in the range of about 0.25 gallons per hour to about 6 gallons per hour, or from 0.5 gallons per hour to about 5 gallons per hour, or even from 1 gallon per hour to about 4 gallons per hour. Here, as well as elsewhere in the specification and claims, individual range values can be combined to form additional and/or non-disclosed ranges. However, as is noted above, the present invention is not limited to solely these supply rates. Rather, any supply rate can be used in order to achieve the desired concentration of halide.

As would be apparent to one of skill in the art, other additional factors can impact the amount of iron-based, iron-bearing and/or iron compounds supplied in connection with the various embodiments of the present invention. Such additional factors include, but are not limited to, the amount and/or type of phosphorus present in the coal, or other combustible fuel; the size and/or output of the boiler, heater, kiln, or other flue gas-, or combustion gas-, generating device; and the desired stoichiometric ratio to be achieved; the type and/or manner of combustion, the type and/or arrangement of any applicable equipment or structure.

In another embodiment, the one or more iron compounds and/or the one or more halide compounds utilized in conjunction with the present invention can be of any particle size and/or particle geometry. Suitable particle geometries include, but are not limited to, spherical, platelet-like, irregular, elliptical, oblong, or a combination of two or more different particle geometries. As would be apparent to those of skill in the art, each different compound, or even the same compound, can be supplied in the form of one or more particle geometries. In one embodiment, the one or more iron compounds and/or the one or more halide compounds of the present invention, if water soluble, can be supplied in solution form, either independently or together so long as the active components to be delivered to the flue, or combustion, gas do not adversely react. In such an instance, a solution concentration of at least about 15 weight percent of one or more water soluble iron compounds and/or one or more water soluble halide compounds is utilized. In another embodiment, a solution concentration of at least about 20 weight percent, at least about 25 weight percent, at least about 30 weight percent, at least about 35 weight percent, at least about 40 weight percent, at least about 45 weight percent, or even at least about 50 weight percent of more of the one or more water soluble iron compounds and/or the one or more water soluble halide compounds is utilized in conjunction with the present invention. Here, as well as elsewhere in the specification and claims, individual range values can be combined to form additional and/or non-disclosed ranges. As would be appreciated by those of skill in the art, the solution concentration of any one or more water soluble iron compounds and/or the one or more water soluble halide compounds should not, in one embodiment, exceed the solubility amount, respectively, for the one or more iron compounds and/or the one or more halide compounds.

In still another embodiment, the one or more iron compounds and/or the one or more halide compounds of the present invention can be supplied in a powdered form, a solution form, an aqueous suspension form, or a combination of two or more thereof. In the case of an aqueous suspension, the one or more iron compounds and/or the one or more halide compounds utilized in conjunction with the present invention should have a suitable particle size. Additionally, even absent the desire to place the one or more iron compounds and/or the one or more halide compounds of the present invention into an aqueous solution, the one or more iron compounds and/or the one or more halide compounds should have a suitable particle size that facilitates a higher degree of reactivity when placed into contact with a flue, or combustion, gas. In one embodiment, both of these conditions can be met, whether individually or in combination, by one or more iron compounds and/or one or more halide compounds where at least about 95 percent of the particles have a particle size of less than about 400 µm (microns), where at least about 95 percent of the particles have a particle size of less than about 350 µm (microns), where at least about 95 percent of the particles have a particle size of less than about 300 µm (microns), where at least about 95 percent of the particles have a particle size of less than about 250 µm (microns), where at least about 95 percent of the particles have a particle size of less than about 200 µm (microns), or even where at least about 95 percent of the particles have a particle size of less than about 175 µm (microns). Here, as well as elsewhere in the specification and claims, individual range values can be combined to form additional and/or non-disclosed ranges.

Although not limited hereto, a suitable iron compound for use in conjunction with the present invention is iron (II) carbonate available from Prince Agri Products (a subsidiary of Phibro Animal Health Corporation located in Ridgefield Park, N.J.). This iron (II) carbonate is a powdered compound where at least about 95 percent of its particles are less than 200 µm (microns) in size. Additionally, the concentration of iron (II) carbonate in this product is about 80 percent by weight with substantially all of the remaining 20 weight percent being non-reactive in light of the use here. A suitable halide compound for use, if so desired, in conjunction with the present invention is calcium bromide available from Tetra Chemical (located in The Woodlands, Tex.).

In the instance where one or more aqueous suspensions is/are utilized in conjunction with the present invention, such aqueous suspension(s) can further comprise a suitable amount of one or more anti-settling, suspension, thickening or emulsification agents. Suitable anti-settling, suspension, thickening or emulsification agents include, but are not limited to, sodium polyacrylates, carbomers, acrylates, and inorganic thickening agents. Other suitable anti-settling, suspension, thickening or emulsification agents are known to those of skill in the art and as such a discussion herein is omitted for the sake of brevity. In another embodiment, a suitable suspension or emulsification can be achieved via agitation and does not necessarily require the use of one or more anti-settling, suspension, thickening or emulsification agents. In another embodiment, a combination of one or more anti-settling, suspension, thickening or emulsification agents can be utilized in combination with agitation.

In still another embodiment, the one or more iron compounds and/or the one or more halide compounds of the present invention should independently have a purity of at least about 50 weight percent, at least about 55 weight percent, at least about 60 weight percent, at least about 65 weight percent, at least about 70 weight percent, at least about 75 weight percent, at least about 80 weight percent, at least about 85 weight percent, at least about 90 weight percent, at least about 95 weight percent, or even at least about 99 weight percent or higher. Here, as well as elsewhere in the specification and claims, individual range values can be combined to form additional and/or non-disclosed ranges.

As for the portion of the one or more iron compounds that is not "an iron compound," such impurities should be non-reactive in the environments present in conjunction with the present invention. Alternatively, if reactive, such impurities should either be easily captured, removed and/or sequestered, or should not add significantly to any further contamination of any catalyst downstream. In still another embodiment, the amount of phosphorus-containing compound impurities in any of the one or more iron compounds and/or the one or more halide compounds that are utilized in conjunction with the present invention should independently be less than about 5 weight percent, less than about 2.5 weight percent, less than about 1 weight percent, less than about 0.5 weight percent, less than about 0.25 weight percent, less than about 0.1 weight percent, or even less than about 0.01 weight percent. Here, as well as elsewhere in the specification and claims, individual range values can be combined to form additional and/or non-disclosed ranges. In still yet another embodiment, the amount of phosphorus-containing compound impurities in any of the one or more iron compounds and/or the one or more halide compounds that are utilized in conjunction with the present invention should be zero. That is, in this embodiment the one or more iron compounds and/or the one or more halide compounds that are utilized in conjunction with the present invention should independently be free from any phosphorus-containing compounds.

While not wishing to be bound to any one theory, it is believed that the present invention exploits various preferential reactions between phosphorus compounds, or phosphorus-containing compounds, to sequester various phosphorus compounds, or phosphorus-containing compounds that are detrimental to an increased active, or service, life of an SCR catalyst. Thus, the reactions discussed herein are to be construed as non-limiting in that other additional reactions may be occurring in the combustion and/or flue gas stream.

In another embodiment, the present invention is direct to a system and method for the injection of iron carbonate, another suitable iron compound, or a blend of one or more iron compounds and one or more non-iron-containing halide compounds with coal in the furnace in order to replenish the active catalytic sites on the surface of SCR catalyst with Fe active sites while simultaneously achieving mercury oxidation. In one instance, the injection material is a blend of iron carbonate (about 90 percent by weight) and a non-iron-containing halogen compound (e.g., calcium bromide 10 percent by weight). As is known to those of skill in the art, any iron that is present in coal ash (including but not limited to PRB coal ash) is not catalytically active as it bonds, or is bonded, with various silicates and/or aluminates in the coal combustion process. In PRB coal more than 90 percent of total iron occurs as a bonded mineral meaning that it is mostly trapped in glassy silica and/or alumina compounds during the combustion process thereby making it unavailable for any other chemical reaction. Thus, the present invention, by injecting iron separately, provides "free" iron that, while not wishing to be bound to any one theory, is believed to settle onto and/or be deposited onto the surface of fly ash which makes it available for further chemical reactions.

This blended material that contains "free" iron as defined above can then provide iron for increasing the catalytic activity and/or catalytic lifespan of the DeNO$_x$ catalyst while, if so provided, the halogen portion of the one or more halide compounds of the present invention acts to aid, or achieve, mercury oxidation. While not wishing to be bound to any one theory, is believed that when the fly ash gets deposited on the surface of SCR catalyst the iron on the surface of fly ash or iron deposited on catalyst as a result of the injection process provides sites onto which ammonia and $NO_x$ can react to form $N_2$ and water. As the iron is injected continuously at a low rate of injection, any active iron sites that become depleted are replaced by new iron sites at a reasonable rate thereby allowing for the extension and/or increase of catalytic lifespan and/or catalytic activity when compared to similar untreated catalyst as explained in detail above. The halogen portion of the halide compound, or compounds, oxidizes elemental mercury into its oxidized form and make it easier for removal by a downstream wet or dry scrubber, or with PAC injection.

While not wishing to be bound to any one example, data to support this invention is supplied from a long-term injection test of iron carbonate at a 100 MWe coal power plant. Before exposure of the catalyst to the combustion flue gas, the catalyst analysis by XRF technique showed negligible iron present both on the surface and in the bulk of catalyst. After approximately 2,000 hours of operation and injection of $FeCO_3$ a catalyst sample is obtained and analyzed by XRF. This sample shows 0.35 percent Fe on the surface and 0.13 percent Fe in bulk. Previously used catalyst (no $FeCO_3$ injection from the same site) had 0.26 percent Fe on surface and 0.06 percent Fe in bulk after 11,000 hours of operation. Baseline testing prior to the injection of iron carbonate indicates that the $SO_3$ concentration is less than 1 ppm in flue gas at the outlet of air heater. After 8,000 plus hours of operation the $SO_3$ concentration is measured at the air heater outlet and is about 2.6 ppm. This proves that iron injection into the furnace is indeed reaching the SCR. The increase in $SO_3$ concentration can be related to the presence of iron on catalyst surface, since Fe is also a good catalyst for conversion of $SO_2$ to $SO_3$.

As noted above, FIG. 2 illustrates catalyst performance with and without iron injection. The upper line plot (the one with the lower case "Xs") is the originally expected catalyst deactivation curve. This catalyst is expected to last for about 16,000 hours of operation. The lower plot (diamonds) illustrates the actual performance for this catalyst. The catalyst actually lasts for only 6,800 hours of operation due to phosphorus deactivation. The middle line (triangles) illustrates the performance of a catalyst subjected to at least the iron compound injection of the present invention. The catalyst in this example is not new when it is installed but is regenerated catalyst with 15 percent lower initial activity than virgin catalyst.

Thus, in one embodiment, the present invention provides additional sites for the $DeNO_x$ reaction by injection of one or more iron-bearing compounds thereby making it possible to significantly improve the life and/or catalytic activity of an SCR catalyst beyond presently accepted, or believed, time spans. When utilized, the one or more halide compounds of the present invention provide a halogen component that permits for increased mercury oxidation and makes possible mercury removal downstream by any suitable technology (e.g., AQCS equipment).

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for increasing the active life of an SCR catalyst, the method comprising the steps of:
    (a) providing at least one coal-based fuel to a furnace, or boiler;
    (b) subjecting the at least one coal-based fuel to a staged combustion process, wherein the staged combustion process produces at least one gaseous phosphorus compound and/or at least one gaseous phosphorus-containing compound;
    (c) providing at least one iron-bearing compound to a combustion zone or flue gas stream of the furnace, or boiler, prior to entry of the flue gas into an SCR, wherein the SCR is located upstream of at least one air heater;
    (d) permitting the at least one iron-bearing compound to react with the at least one gaseous phosphorus compound and/or the at least one gaseous phosphorus-containing compound present in the combustion zone or flue gas prior to the entry of the flue gas into the SCR to form an iron phosphorus-containing compound;
    (e) providing at least one halide-bearing compound to a combustion zone or flue gas stream of a furnace, or boiler, prior to entry of the flue gas into an SCR, with the proviso that halide-bearing compound is not an iron halide; and
    (f) permitting the at least one halide-bearing compound to react with and/or oxidize any mercury present in the combustion zone or flue gas,
    wherein the method achieves an increase in either one, or both, of a catalytic activity and/or a catalytic lifespan of at least about 10 percent at an operational time of at least about 2,000 hours.

2. The method of claim 1, wherein the iron-bearing compound is selected from metallic iron, one or more iron oxides, iron carbonate, or mixtures of two or more thereof.

3. The method of claim 1, wherein the iron-bearing compound is selected from iron (III) oxide, iron (II) carbonate, iron (II) oxide, or mixtures of two or more thereof.

4. The method of claim 1, wherein the iron-bearing compound is selected from iron (III) oxide, iron (II) carbonate, or a mixture thereof.

5. The method of claim 1, wherein the at least one iron-bearing compound is provided to the combustion zone via addition to pulverized coal.

6. The method of claim 1, wherein the at least one iron-bearing compound is provided to the combustion zone via a dedicated supply line.

7. The method of claim 1, wherein the halide-bearing compound is selected from potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, transition metal halides with the proviso that the transition metal is not iron, or any mixture of two or more thereof or mixtures of two or more thereof.

8. The method of claim 1, wherein the iron-bearing compound is selected from iron (II) carbonate and the halide-bearing compound is selected from calcium bromide.

9. The method of claim 1, wherein the at least one halide-bearing compound is provided to the combustion zone via addition to pulverized coal.

10. The method of claim 1, wherein the at least one halide-bearing compound is provided to the combustion zone via a dedicated supply line.

11. The method of claim 1, wherein the at least one iron-bearing compound is provided at an excess stoichiometric ratio of iron to phosphorus is in the range of about 2.5:1 to about 10:1.

12. The method of claim 1, wherein the at least one iron-bearing compound is provided at an excess stoichiometric ratio of iron to phosphorus is in the range of about 3.5:1 to about 8:1.

13. The method of claim 1, wherein the at least one halide-bearing compound is provided at sufficient amount to yield a halide concentration of between about 10 ppm to about 200 ppm.

14. The method of claim 1, wherein the iron-bearing compound is a water soluble iron-bearing compound.

15. The method of claim 1, wherein the iron-bearing compound is a water soluble iron-bearing compound that is supplied in the form of an aqueous solution.

16. The method of claim 1, wherein the iron-bearing compound is a water insoluble iron-bearing compound that is supplied in the form of an aqueous suspension or emulsion.

17. The method of claim 1, wherein the at least one iron-bearing halide compound is provided to the combustion zone via addition to raw coal which is thereafter pulverized.

18. The method of claim 1, wherein the staged combustion process utilizes over fire air and the staged combustion process results in an increased amount of the at least one gaseous phosphorus compound and/or the at least one gaseous phosphorus-containing compound and results in the deactivation of the SCR catalyst.

19. A method for increasing the active life of an SCR catalyst, the method comprising the steps of:
(i) providing at least one coal-based fuel to a furnace, or boiler;
(ii) subjecting the at least one coal-based fuel to a staged combustion process, wherein the staged combustion process produces at least one gaseous phosphorus compound and/or at least one gaseous phosphorus-containing compound;
(iii) providing at least one iron-bearing compound to a combustion zone or flue gas stream of the furnace, or boiler, prior to entry of the flue gas into an SCR, wherein the SCR is located upstream of at least one air heater;
(iv) permitting the at least one iron-bearing compound to react with the at least one gaseous phosphorus compound and/or the at least one gaseous phosphorus-containing compound present in the combustion zone or flue gas prior to the entry of the flue gas into the SCR to form an iron phosphorus-containing compound;
(v) providing at least one halide-bearing compound to a combustion zone or flue gas stream of a furnace, or boiler, prior to entry of the flue gas into an SCR, with the proviso that halide-bearing compound is not an iron halide; and
(vi) permitting the at least one halide-bearing compound to react with and/or oxidize any mercury present in the combustion zone or flue gas,
wherein the method achieves an increase in either one, or both, of a catalytic activity and/or a catalytic lifespan of at least about 15 percent at an operational time of at least about 3,000 hours.

20. The method of claim 19, wherein the iron-bearing compound is selected from metallic iron, one or more iron oxides, iron carbonate, or mixtures of two or more thereof.

21. The method of claim 19, wherein the iron-bearing compound is selected from iron (III) oxide, iron (II) carbonate, iron (II) oxide, or mixtures of two or more thereof.

22. The method of claim 19, wherein the iron-bearing compound is selected from iron (III) oxide, iron (II) carbonate, or a mixture thereof.

23. The method of claim 19, wherein the at least one iron-bearing compound is provided to the combustion zone via addition to pulverized coal.

24. The method of claim 19, wherein the at least one iron-bearing compound is provided to the combustion zone via a dedicated supply line.

25. The method of claim 19, wherein the halide-bearing compound is selected from potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, transition metal halides with the proviso that the transition metal is not iron, or any mixture of two or more thereof or mixtures of two or more thereof.

26. The method of claim 19, wherein the iron-bearing compound is selected from iron (II) carbonate and the halide-bearing compound is selected from calcium bromide.

27. The method of claim 19, wherein the at least one halide-bearing compound is provided to the combustion zone via addition to pulverized coal.

28. The method of claim 19, wherein the at least one halide-bearing compound is provided to the combustion zone via a dedicated supply line.

29. The method of claim 19, wherein the at least one iron-bearing compound is provided at an excess stoichiometric ratio of iron to phosphorus is in the range of about 2.5:1 to about 10:1.

30. The method of claim 19, wherein the at least one iron-bearing compound is provided at an excess stoichiometric ratio of iron to phosphorus is in the range of about 3.5:1 to about 8:1.

31. The method of claim 19, wherein the at least one halide-bearing compound is provided at sufficient amount to yield a halide concentration of between about 10 ppm to about 200 ppm.

32. The method of claim 19, wherein the iron-bearing compound is a water soluble iron-bearing compound.

33. The method of claim 19, wherein the iron-bearing compound is a water soluble iron-bearing compound that is supplied in the form of an aqueous solution.

34. The method of claim 19, wherein the iron-bearing compound is a water insoluble iron-bearing compound that is supplied in the form of an aqueous suspension or emulsion.

35. The method of claim 19, wherein the at least one iron-bearing halide compound is provided to the combustion zone via addition to raw coal which is thereafter pulverized.

36. The method of claim 19, wherein the staged combustion process utilizes over fire air and the staged combustion process results in an increased amount of the at least one gaseous phosphorus compound and/or the at least one gaseous phosphorus-containing compound and results in the deactivation of the SCR catalyst.

37. A method for simultaneously sequestering one or more gaseous phosphorus compounds, or gaseous phosphorus-containing compounds, in the form of one or more less reactive iron-phosphorus-containing compounds, and oxidizing mercury, the method comprising the steps of:
(A) providing at least one coal-based fuel to a furnace, or boiler;
(B) subjecting the at least one coal-based fuel to a staged combustion process, wherein the staged combustion process produces at least one gaseous phosphorus compound and/or at least one gaseous phosphorus-containing compound;

(C) providing at least one iron-bearing compound to a combustion of the furnace, or boiler; and (D) permitting the at least one iron-bearing compound to react with the at least one gaseous phosphorus compound and/or the at least one gaseous phosphorus-containing compound present in the combustion zone or flue gas to form one or more less reactive iron-phosphorus-containing compounds;

(E) providing at least one halide-bearing compound to a combustion zone or flue gas stream of a furnace, or boiler, prior to entry of the flue gas into an SCR, with the proviso that halide-bearing compound is not an iron halide; and (F) permitting the at least one halide-bearing compound to react with and/or oxidize any mercury present in the combustion zone or flue gas, wherein the method achieves an increase in either one, or both, of a catalytic activity and/or a catalytic lifespan of at least about 10 percent at an operational time of at least about 4,000 hours.

38. The method of claim 37, wherein the iron-bearing compound is selected from metallic iron, one or more iron oxides, iron carbonate, or mixtures of two or more thereof.

39. The method of claim 37, wherein the iron-bearing compound is selected from iron (III) oxide, iron (II) carbonate, iron (II) oxide, or mixtures of two or more thereof.

40. The method of claim 37, wherein the iron-bearing compound is selected from iron (III) oxide, iron (II) carbonate, or a mixture thereof.

41. The method of claim 37, wherein the at least one iron-bearing compound is provided to the combustion zone via addition to pulverized coal.

42. The method of claim 37, wherein the at least one iron-bearing compound is provided to the combustion zone via a dedicated supply line.

43. The method of claim 37, wherein the halide-bearing compound is selected from potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, transition metal halides with the proviso that the transition metal is not iron, or any mixture of two or more thereof or mixtures of two or more thereof.

44. The method of claim 37, wherein the iron-bearing compound is selected from iron (II) carbonate and the halide-bearing compound is selected from calcium bromide.

45. The method of claim 37, wherein the at least one halide-bearing compound is provided to the combustion zone via addition to pulverized coal.

46. The method of claim 37, wherein the at least one halide-bearing compound is provided to the combustion zone via a dedicated supply line.

47. The method of claim 37, wherein the at least one iron-bearing compound is provided at an excess stoichiometric ratio of iron to phosphorus is in the range of about 2.5:1 to about 10:1.

48. The method of claim 37, wherein the at least one iron-bearing compound is provided at an excess stoichiometric ratio of iron to phosphorus is in the range of about 3.5:1 to about 8:1.

49. The method of claim 37, wherein the at least one halide-bearing compound is provided at sufficient amount to yield a halide concentration of between about 10 ppm to about 200 ppm.

50. The method of claim 37, wherein the one or more less reactive iron-phosphorus-containing compounds further contains oxygen.

51. The method of claim 37, wherein the iron-bearing compound is a water soluble iron-bearing compound.

52. The method of claim 37, wherein the iron-bearing compound is a water soluble iron-bearing compound that is supplied in the form of an aqueous solution.

53. The method of claim 37, wherein the iron-bearing compound is a water insoluble iron-bearing compound that is supplied in the form of an aqueous suspension or emulsion.

54. The method of claim 37, wherein the staged combustion process utilizes over fire air and the staged combustion process results in an increased amount of the at least one gaseous phosphorus compound and/or the at least one gaseous phosphorus-containing compound and results in an increased acid gas concentration in the flue gas.

55. A method for simultaneously sequestering one or more gaseous phosphorus compounds, or gaseous phosphorus-containing compounds, in the form of one or more less reactive iron-phosphorus-containing compounds, and oxidizing mercury, the method comprising the steps of:

(I) providing at least one coal-based fuel to a furnace, or boiler;

(II) subjecting the at least one coal-based fuel to a staged combustion process, wherein the staged combustion process produces at least one gaseous phosphorus compound and/or at least one gaseous phosphorus-containing compound;

(III) providing at least one iron-bearing compound to a combustion zone of the furnace, or boiler; and (IV) permitting the at least one iron-bearing compound to react with the at least one gaseous phosphorus compound and/or the at least one gaseous phosphorus-containing compound present in the combustion zone or flue gas to form one or more less reactive iron-phosphorus-containing compounds;

(V) providing at least one halide-bearing compound to a combustion zone or flue gas stream of a furnace, or boiler, prior to entry of the flue gas into an SCR, with the proviso that halide-bearing compound is not an iron halide; and (IV) (VI) permitting the at least one halide-bearing compound to react with and/or oxidize any mercury present in the combustion zone or flue gas, wherein the method achieves an increase in either one, or both, of a catalytic activity and/or a catalytic lifespan of at least about 15 percent at an operational time of at least about 3,000 hours.

56. The method of claim 55, wherein the iron-bearing compound is selected from metallic iron, one or more iron oxides, iron carbonate, or mixtures of two or more thereof.

57. The method of claim 55, wherein the iron-bearing compound is selected from iron (III) oxide, iron (II) carbonate, iron (II) oxide, or mixtures of two or more thereof.

58. The method of claim 55, wherein the iron-bearing compound is selected from iron (III) oxide, iron (II) carbonate, or a mixture thereof.

59. The method of claim 55, wherein the at least one iron-bearing compound is provided to the combustion zone via addition to pulverized coal.

60. The method of claim 55, wherein the at least one iron-bearing compound is provided to the combustion zone via a dedicated supply line.

61. The method of claim 55, wherein the halide-bearing compound is selected from potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, transition metal halides with the proviso that the transition metal is not iron, or any mixture of two or more thereof or mixtures of two or more thereof.

62. The method of claim 55, wherein the iron-bearing compound is selected from iron (II) carbonate and the halide-bearing compound is selected from calcium bromide.

63. The method of claim 55, wherein the at least one halide-bearing compound is provided to the combustion zone via addition to pulverized coal.

64. The method of claim 55, wherein the at least one halide-bearing compound is provided to the combustion zone via a dedicated supply line.

65. The method of claim 55, wherein the at least one iron-bearing compound is provided at an excess stoichiometric ratio of iron to phosphorus is in the range of about 2.5:1 to about 10:1.

66. The method of claim 55, wherein the at least one iron-bearing compound is provided at an excess stoichiometric ratio of iron to phosphorus is in the range of about 3.5:1 to about 8:1.

67. The method of claim 55, wherein the at least one halide-bearing compound is provided at sufficient amount to yield a halide concentration of between about 10 ppm to about 200 ppm.

68. The method of claim 55, wherein the one or more less reactive iron-phosphorus-containing compounds further contains oxygen.

69. The method of claim 55, wherein the iron-bearing compound is a water soluble iron-bearing compound.

70. The method of claim 55, wherein the iron-bearing compound is a water soluble iron-bearing compound that is supplied in the form of an aqueous solution.

71. The method of claim 55, wherein the iron-bearing compound is a water insoluble iron-bearing compound that is supplied in the form of an aqueous suspension or emulsion.

72. The method of claim 55, wherein the staged combustion process utilizes over fire air and the staged combustion process results in an increased amount of the at least one gaseous phosphorus compound and/or the at least one gaseous phosphorus-containing compound and results in an increased acid gas concentration in the flue gas.

73. A method for sequestering one or more gaseous phosphorus compounds, or gaseous phosphorus-containing compounds, in the form of one or more less reactive iron-phosphorus-containing compounds while concurrently sequestering mercury, the method comprising the steps of:
providing at least one coal-based fuel to a furnace, or boiler;
subjecting the at least one coal-based fuel to a staged combustion process, wherein the staged combustion process produces at least one gaseous phosphorus compound and/or at least one gaseous phosphorus-containing compound;
providing at least one iron-bearing compound to a combustion zone of the furnace, or boiler; and
permitting the at least one iron-bearing compound to react with the at least one gaseous phosphorus compound and/or the at least one gaseous phosphorus-containing compound present in the combustion zone or flue gas to form one or more less reactive iron-phosphorus-containing compounds;
providing at least one halide-bearing compound to a combustion zone or flue gas stream of a furnace, or boiler, prior to entry of the flue gas into an SCR, with the proviso that halide-bearing compound is not an iron halide; and
permitting the at least one halide-bearing compound to react with and/or oxidize any mercury present in the combustion zone or flue gas,
wherein the method achieves an increase in either one, or both, of a catalytic activity and/or a catalytic lifespan of at least about 15 percent at an operational time of at least about 4,000 hours.

74. The method of claim 73, wherein the iron-bearing compound is selected from metallic iron, one or more iron oxides, iron carbonate, or mixtures of two or more thereof.

75. The method of claim 73, wherein the iron-bearing compound is selected from iron (III) oxide, iron (II) carbonate, iron (II) oxide, or mixtures of two or more thereof.

76. The method of claim 73, wherein the iron-bearing compound is selected from iron (III) oxide, iron (II) carbonate, or a mixture thereof.

77. The method of claim 73, wherein the at least one iron-bearing compound is provided to the combustion zone via addition to pulverized coal.

78. The method of claim 73, wherein the at least one iron-bearing compound is provided to the combustion zone via a dedicated supply line.

79. The method of claim 73, wherein the halide-bearing compound is selected from potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, transition metal halides with the proviso that the transition metal is not iron, or any mixture of two or more thereof or mixtures of two or more thereof.

80. The method of claim 73, wherein the iron-bearing compound is selected from iron (II) carbonate and the halide-bearing compound is selected from calcium bromide.

81. The method of claim 73, wherein the at least one halide-bearing compound is provided to the combustion zone via addition to pulverized coal.

82. The method of claim 73, wherein the at least one halide-bearing compound is provided to the combustion zone via a dedicated supply line.

83. The method of claim 73, wherein the at least one iron-bearing compound is provided at an excess stoichiometric ratio of iron to phosphorus is in the range of about 2.5:1 to about 10:1.

84. The method of claim 73, wherein the at least one iron-bearing compound is provided at an excess stoichiometric ratio of iron to phosphorus is in the range of about 3.5:1 to about 8:1.

85. The method of claim 73, wherein the at least one halide-bearing compound is provided at sufficient amount to yield a halide concentration of between about 10 ppm to about 200 ppm.

86. The method of claim 73, wherein the one or more less reactive iron-phosphorus-containing compounds further contains oxygen.

87. The method of claim 73, wherein the iron-bearing compound is a water soluble iron-bearing compound.

88. The method of claim 73, wherein the iron-bearing compound is a water soluble iron-bearing compound that is supplied in the form of an aqueous solution.

89. The method of claim 73, wherein the iron-bearing compound is a water insoluble iron-bearing compound that is supplied in the form of an aqueous suspension or emulsion.

90. The method of claim 73, wherein the staged combustion process utilizes over fire air and the staged combustion process results in an increased amount of the at least one gaseous phosphorus compound and/or the at least one gaseous phosphorus-containing compound and results in an increased acid gas concentration in the flue gas.

91. A method for increasing the active life of an SCR catalyst, the method comprising the steps of:
providing at least one coal-based fuel to a furnace, or boiler;
subjecting the at least one coal-based fuel to a staged combustion process, wherein the staged combustion process produces at least one gaseous phosphorus compound and/or at least one gaseous phosphorus-containing compound;
providing at least one iron-bearing compound to a combustion zone or flue gas stream of the furnace, or boiler, prior to entry of the flue gas into an SCR, wherein the SCR is located upstream of at least one air heater; and
permitting the at least one iron-bearing compound to react with the at least one gaseous phosphorus compound and/or the at least one gaseous phosphorus-containing compound present in the combustion zone or flue gas prior to the entry of the flue gas into the SCR to form an iron phosphorus-containing compound,
wherein the method achieves an increase in either one, or both, of a catalytic activity and/or a catalytic lifespan of at least about 10 percent at an operational time of at least about 2,000 hours.

92. The method of claim 91, wherein the iron-bearing compound is selected from metallic iron, one or more iron oxides, iron carbonate, or mixtures of two or more thereof.

93. The method of claim 91, wherein the iron-bearing compound is selected from iron (III) oxide, iron (II) carbonate, iron (II) oxide, or mixtures of two or more thereof.

94. The method of claim 91, wherein the iron-bearing compound is selected from iron (III) oxide, iron (II) carbonate, or a mixture thereof.

95. The method of claim 91, wherein the at least one iron-bearing compound is provided to the combustion zone via addition to pulverized coal.

96. The method of claim 91, wherein the at least one iron-bearing compound is provided to the combustion zone via a dedicated supply line.

97. The method of claim 91, wherein the at least one iron-bearing compound is provided at an excess stoichiometric ratio of iron to phosphorus is in the range of about 2.5:1 to about 10:1.

98. The method of claim 91, wherein the at least one iron-bearing compound is provided at an excess stoichiometric ratio of iron to phosphorus is in the range of about 3.5:1 to about 8:1.

99. The method of claim 91, wherein the iron-bearing compound is a water soluble iron-bearing compound.

100. The method of claim 91, wherein the iron-bearing compound is a water soluble iron-bearing compound that is supplied in the form of an aqueous solution.

101. The method of claim 91, wherein the iron-bearing compound is a water insoluble iron-bearing compound that is supplied in the form of an aqueous suspension or emulsion.

102. The method of claim 91, wherein the at least one iron-bearing compound is provided to the combustion zone via addition to raw coal which is thereafter pulverized.

103. The method of claim 91, wherein the staged combustion process utilizes over fire air and the staged combustion process results in an increased amount of the at least one gaseous phosphorus compound and/or the at least one gaseous phosphorus-containing compound and results in the deactivation of the SCR catalyst.

* * * * *